Figure 1:
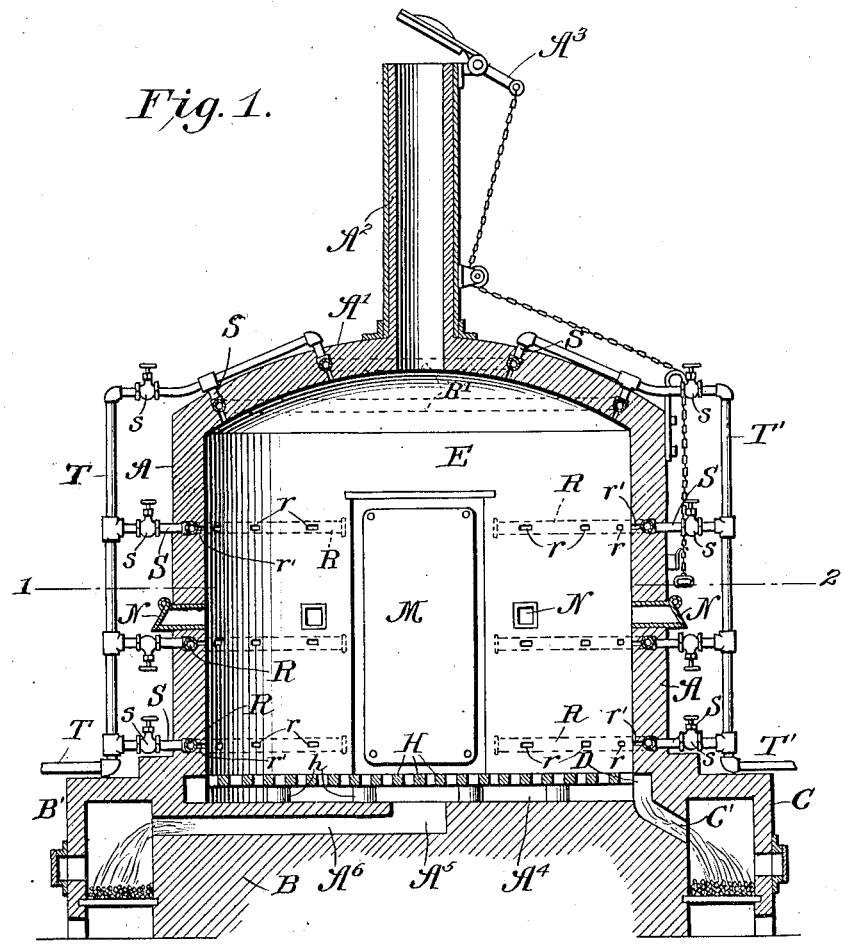

No. 851,639. PATENTED APR. 30, 1907.
G. O. ANGELL.
PROCESS OF PRODUCING ZINC SULFATE DIRECTLY FROM THE ORE.
APPLICATION FILED NOV. 12, 1904. RENEWED JUNE 7, 1906.

2 SHEETS—SHEET 1.

WITNESSES:

INVENTOR
George O. Angell
BY
ATTORNEY.

No. 851,639. PATENTED APR. 30, 1907.
G. O. ANGELL.
PROCESS OF PRODUCING ZINC SULFATE DIRECTLY FROM THE ORE.
APPLICATION FILED NOV. 12, 1904. RENEWED JUNE 7, 1906.

2 SHEETS—SHEET 2.

WITNESSES:

INVENTOR
George O. Angell
BY
ATTORNEY.

UNITED STATES PATENT OFFICE.

GEORGE O. ANGELL, OF PHILADELPHIA, PENNSYLVANIA.

PROCESS OF PRODUCING ZINC SULFATE DIRECTLY FROM THE ORE.

No. 851,639.　　　　　Specification of Letters Patent.　　　Patented April 30, 1907.

Application filed November 12, 1904. Renewed June 7, 1906. Serial No. 320,572.

*To all whom it may concern:*

Be it known that I, GEORGE O. ANGELL, a citizen of the United States, residing in the city of Philadelphia, State of Pennsylvania, have invented a certain new and useful Process of Producing Sulfate of Zinc Directly from Zinc-Bearing Ores, of which the following is a full, clear, and exact description, reference being had to the accompanying drawings, forming a part of this specification.

My invention relates to the treatment of zinciferous sulfid ores which are usually complex sulfid ores of zinc generally containing associated iron pyrites, lead and copper sulfids and frequently carry silver, gold and other metals; and my invention has for its object the conversion of substantially the whole of the zinc sulfid in the ore blende into soluble zinc sulfate, directly, through the medium of means which will effect the oxidation of the zinc sulfid, and also the copper sulfid if any be present, and convert the former ($ZnS$) into zinc sulfate ($ZnSO_4$), and also produce, as a valuable by-product, a residuum ore in improved and most desirable condition for smelting purposes.

To these ends my invented process hereinafter fully described consists essentially in treating zinciferous sulfid ore blendes containing iron pyrites or to which the latter is added artificially in the process, to convert the constituent zinc and copper sulfids directly into soluble sulfates, whereby they may be readily separated from the insoluble residual ore, and the latter thereby improved for smelting purposes; which said results are effected by subjecting such zinciferous ore blendes to the action of a prolonged heat, in a substantially closed chamber, to the action of oxidizing agents produced by burning the constituent ore sulfids in the blende in the presence of free oxygen and sulfur dioxid produced by admitting air and steam, under regulation, to the heated ore in said closed chamber; and finally depositing the charge in a water bath, dissolving the soluble sulfate of zinc, and of copper if any be present, and separating them from the solution.

My process is adapted to produce the desired result from all zinciferous sulfid ores, ordinarily suitable for furnace treatment; many of which contain iron, gold, silver, lead, copper and other constituents, and it is particularly effective on ferruginous zinc ores, on account of their relatively large percentage of iron pyrites constituent, although most zinc-bearing ores contain iron pyrites. This constituent aids very materially in carrying out my process, because, under prolonged heat, iron sulfate is formed preliminarily from the pyrites, the iron sulfate in turn being decomposed, under continued and gradually raised heat, and giving off its constituent sulfur oxids to aid in sulfating the zinc. In sulfating, by my process, if any particular zinc-bearing ore that may happen to be used, is largely deficient in iron pyrites, I recommend the addition thereto when mixing the charge for the furnace of sufficient iron pyrites to compensate for the deficiency, to bring it up to the average of zinciferous ores in that regard.

In regard to the mechanical features of my process, it is essential to its success that it be practiced through the agency of a suitable furnace containing a chamber operating primarily as a roasting chamber either by externally applied heat, or preferably by heat passing through it, to liberate the sulfur gases in the "blende," and secondarily as a sulfating chamber by the conservation therein of the liberated sulfur dioxid and trioxid acting on the zinc oxid formed from the sulfid, in the presence of free oxygen derived from air admitted under proper regulation to the chamber, and in the presence of steam admitted to said chamber, under like regulation, to hold the sulfur gases in saturated suspension as well as to control the temperature and prevent a "burning" of the zinc sulfate and a consequent reconversion of it into zinc oxid.

Figure 2:
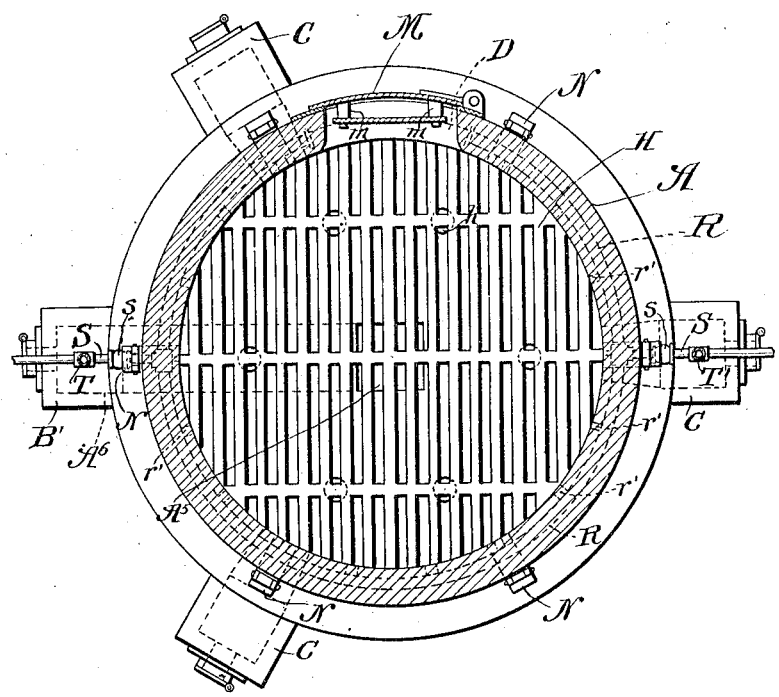

A suitable and preferred form of furnace specially adapted to carry out my process expeditiously and with certainty, is that invented by me for the purpose and shown in the drawings annexed hereto, wherein Figure 1 is a vertical sectional view, and Fig. 2 is a lateral section through the line 1—2 of Fig. 1.

Referring to said drawings A represents a circular furnace of brick, with a closed top A' having a central flue A² controlled by a damper A³; and a base B of solid brickwork provided with the flue passages hereinafter described. Said base is preferably of slightly larger diameter than the furnace body A, and provided thereat with a projecting series of fire-boxes C at suitable intervals, and another such fire-box B' of like character and location. In the cross-section Fig. 2 one such fire-box B' is shown, and three such fire-boxes C, in the series.

The inclosing brick walls of the furnace proper, form a roasting and sulfating chamber E, wherein may be performed the preliminary roasting of the ore in the first step of the process. This furnace is provided with a centrally-disposed flue $A^2$ proceeding from its cover wall A' and this flue is governed by a damper $A^3$. At the basal floor $A^4$ of the furnace, is provided a flue passage $A^5$, preferably in vertical alinement with the overhead dampered flue $A^2$; and said basal flue passage $A^5$ communicates directly by a lateral flue passage $A^6$ in the basal wall of the furnace, with the single fire-box B'. Other similar fire-boxes C are built into the annularly-projecting base-wall of the furnace, at suitable intervals. In Fig. 2, three such fire-boxes are shown. They each communicate by a flue C' to the interior of the furnace, though not directly but through an annular flue chamber D let into the vertical wall A of the furnace at its conjunction with the base or floor $A^4$, upon which the grate H supported upon short pillars $h$, rests; the grate being of a size to snugly fit the roasting chamber above the annular flue D. The result of which is that the flame and hot products of combustion will have a more or less circuitous path to travel and prevent them striking too directly the body of ore resting on the grate. Entrance to the roasting chamber of the furnace, for charging and discharging the ore, is provided through a passage in the wall, on which is hung a door M, with suitable lining plate $m$ transversely in the opening in the wall. Peep holes N in the furnace wall are provided in the region of the roasting chamber, to enable the operation of the furnace to be easily inspected from time to time, during the roasting and sulfating. Embedded in the vertical wall A of the furnace is a pipe or series of pipe R, shown as three in number. A like piping R' is contained in the capping wall A' of the furnace; the drawings show two such pipes. These pipes have closed ends, and are punctured with a series of small holes $r$ arranged opposite to interstices $r'$ in the wall of the furnace, so as to discharge air and steam, or either, into the roasting chamber of the furnace. Said holes $r$ should vary in size, the smaller being opposite the point where the supply of air or steam is admitted. Such supply is admitted through short end pipes S which are fitted into suitable openings in the said radial pipes R. Said pipes S are governed by valve-cocks $s$, and are fitted to initial supply pipes T T', arranged on opposite sides of the furnace; one of these initial supply pipes being used for the admission of steam and the other for supplying a current of air, to the roasting chamber.

The operation of the device is as follows: The roasting chamber is charged through the door M and the passage governed thereby. The fire-boxes of the furnace being started the heated products of combustion will be drawn through the flue-like passages to the roasting-chamber E, through the grate H to and out of the overhead stack $A^2$; and, when the damper $A^3$ is opened wide, then through the central flue $A^5$ so as to pass a portion of the heat centrally through the roasting chamber E. The pipes R and their adjunctive tubular connections enable air to be supplied through pipe T to the roasting chamber E primarily for the purpose of supplying oxygen, secondarily to regulate the temperature within said chamber. The same series of pipes R are employed to admit steam through the initial supply pipe T'. Said perforated pipes R being separate from each other, in the series, any one can be brought into action to discharge the air or steam to any particular part of the roasting chamber, as may be desired. At the outstart the damper $A^3$ should be thrown wide open so that all the draft flues shall be brought into use; indeed the damper $A^3$ should never be wholly closed, but should be so far closed, after sulfating begins, as to make the roasting chamber substantially a closed chamber, to retain more or less of the sulfur gases. Excess of sulfur gases in the chamber E are thus drawn off through the stack $A^2$, without diminishing the quantity thereof required in the roasting chamber. After three to five hours of such operation, the blue flame emitted will indicate that the temperature has risen high enough and been continued long enough to evolve and ignite sulfur gases constituent in the roasting ore, whereupon the fires should be damped or the temperature materially lowered, by the addition of air or steam, or both, to the roasting chamber; though previous thereto, air should be admitted to the chamber in sufficient quantities to supply the requisite oxygen needed.

In order to enable others to carry out my new process practically I will now describe each step in detail.

As a preliminary to presenting the ore in the best form to the treatment involved in my process, the ore should be ground and mixed with a suitable binder of neutral character and which will resist high heat, such as clay for example, for my process contemplates, in its most effective form, submitting the ore to the treatment, in compact masses rather than when pulverulent; and to that end the ground ore and its binder are formed into cakes, such as briquets; and in order that these should have as large an exposed surface as possible to be acted on by the gases or gaseous atmosphere in the roasting and sulfating chamber of the furnace, I recommend that they be perforated, corrugated or slotted. With the ore so prepared for treatment, the next step, or rather the first step proper, in the process, is the application to the ore of a high heat, applied externally of a containing chamber, but preferably in a furnace of such character that the products of combustion will be carried through flues to the chamber containing the ore, and in which chamber air is to be admitted through suitable apertures for the purpose of supplying oxygen, the roasting being continued so long only that the ore sulfids will give off constituent sulfur gases, and when these are given off in quantity and ignited, the furnace heat had best be shut off or the fires damped, the burning sulfur gases then, in conjunction with the oxygen present, being sufficient to maintain the requiste heat to complete the process. This is readily accomplished in a furnace containing a chamber the entrance to which, of the products of combustion from fire-boxes, is through flues, and the exit from which is a damper-controlled draft stack, and through the walls of which chamber, air pipes and steam pipes are projected to discharge, under proper control, into such chamber, the air and steam required. The steam being used for the double purpose of readily lowering the temperature, when necessary, and for supplying a medium for holding the sulfur gases in saturated suspension, whereby sulfurous acid gas is formed, passing thence into sulfuric anhydrid.

The roasting effect on the "blende" is, as respects the iron pyrites present, whether either initially in the ore or applied in mixing the charge to make up a deficiency therein, to primarily convert the iron sulfid into iron sulfate, and then, under continued and gradually raised heat, decomposing the ferric sulfate and liberating its constituent sulfur oxids, which, as before stated, aid very materially in sulfating the zinc present in the "blende."

The process complete will require about six days' time for average zinciferous ores. Beginning it, the temperature in the chamber is brought up to 7,000 to 10,000 C. It is preferable, if the source of heat is carried through the body of ore in the chamber, instead of externally applied, and that the products of combustion should not include flame from the fire boxes. As before stated, the source of heat is shut off when the roasting has so far progressed that the liberated sulfur and oxygen from admitted air ignite and supply a blue flame throughout the body of the ore in the chamber. The temperature can then be regulated and controlled, with sufficient accuracy, by air and steam admitted to aid in the sulfating, to complete the process. The higher and perhaps at the lower temperature named, if continued after sulfate of zinc is formed, would theoretically tend to break down the sulfate rather than to hold it stable or continue to form it from the zinc sulfid in the ore, but I have found that in the strong atmosphere of sulfuric anhydrid present as the result of burning the liberated sulfur in the presence of hot oxids and steam, that the complete reaction takes place as stated, and that if there be any breaking down of the zinc sulfate after it is formed, it is immediately re-formed by the agencies stated, which at same time change the iron sulfid first into a sulfate and then break it down, yielding insoluble ferric oxid and sulfur dioxid, the latter forming sulfuric anhydrid as stated. The process is economical, due to the reaction on the iron pyrites which supplies much heat to carry on the operation, and because of the intimate contact of freshly formed sulfates of iron with the zinc sulfid acted on.

I believe I am the first to accomplish a substantially complete sulfating of zinciferous ones, and the first to effect it by a method radically different from any other heretofore known.

Analyses I have made of results obtained by my process, in actual use, show the complete conversion of almost all the zinc sulfid in the charge into zinc sulfate. In an ore containing 15.8 per cent. of zinc, associated with iron and lead as sulfids and 12 per cent. of silicon, I was able to convert all the zinc to sulfate within the limits of error of analysis. An obvious advantage from such results, is to enable one to make use of the refractory ores which are not satisfactorily treated by any other method. The final washing out of the zinc sulfate, as hereinafter described, I found presented no obstacle to the smelting of the residue from the lixiviation.

The final step in the process will now be described. When the sulfating step has been completed, the bricks of ore are to be withdrawn from the furnace and preferably ground to break up the clay binder used. The ground mass is put into suitable tanks filled with enough water to dissolve the zinc sulfate (which is now soluble) and any other soluble sulfate present, such as copper. The solution is then filtered or decanted, by any suitable and usual means, with the result that there is left a residue consisting of iron oxids, the gangue (silicious matter) of the original ore, practically the whole of the lead, and any unconverted sulfids. As a by-product, if the ore contained any silver or gold, it is in an improved and most desirable condition for smelting purposes. The filtered contents of the solution contains the sulfate of zinc in solution, from evaporation of which crystallized zinc sulfate results; but instead of evaporation any well-known process for the separation and recovery of zinc sulfate from an aqueous solution thereof can be substituted with like effect.

Having thus described my invention, I claim as new and desire to secure by Letters Patent:—

1. The process described of treating zinciferous ores containing sulfids of those metals, to convert and recover their constituent zinc and copper sulfids as soluble sulfates, direct from the ore, which consists in subjecting the ore, in a substantially closed chamber, to the action of burning sulfur oxids liberated, under the action of a preliminary roasting heat in the same chamber, from the constituent ore sulfids present, in the presence of free oxygen derived from air admitted to said chamber.

2. The process described, of producing and recovering zinc sulfate direct from zinciferous ore sulfids, which consists in subjecting the ore blendes to a preliminary roasting heat in a suitably-chambered furnace to form oxids of the metals present and to liberate their sulfurous constituent, then conserving the latter gaseous product in a substantially closed chamber of the furnace and burning it therein, by its own flame, in the presence of oxygen liberated from air admitted to the chamber, and finally dissolving the resulting soluble sulfates and recovering the crystallized zinc sulfate from the aqueous solution.

3. The process described of producing soluble sulfates of zinc and copper direct from zinciferous ores containing sulfids of those metals, which consists in roasting the ore in a suitably-chambered furnace to liberate its sulfurous constituent as gaseous sulfur oxids, shutting off applied heat and substantially closing the chamber at this stage, conserving and burning said gases therein in steam-saturated suspension and in the presence of oxygen derived from air admitted to such chamber, to form sulfuric anhydrid to act upon the zinc and copper oxids present in the charge; and finally separating out the resultant soluble sulfates from the charge, in an aqueous solution.

4. The process described of producing and recovering pure sulfates of zinc and copper direct from zinciferous ores containing sulfids of those metals, which comprises crushing the ore together with iron pyrites added to the mass, roasting the charge in a suitably-chambered furnace to liberate its sulfurous constituent as gaseous sulfur oxids, conserving and burning these gases in the same chamber in the presence of oxygen derived from air admitted to the chamber, and finally depositing the charge in a water bath, dissolving the soluble sulfates of zinc and copper therein, and recovering the pure sulfates from the aqueous solution.

In testimony whereof, I have hereunto affixed my signature this 24th day of October A. D. 1904.

GEORGE O. ANGELL.

Witnesses:
   CHAS. W. MILLER,
   GEO. A. JENNIS.